D. L. STOUCH.
TIRE.
APPLICATION FILED APR. 13, 1922.

1,422,899.

Patented July 18, 1922.

Inventor
D. L. Stouch

By
Attorney

UNITED STATES PATENT OFFICE.

DANIEL L. STOUCH, OF YORK, PENNSYLVANIA.

TIRE.

1,422,899.  Specification of Letters Patent.  Patented July 18, 1922.

Application filed April 13, 1922. Serial No. 552,269.

*To all whom it may concern:*

Be it known that I, DANIEL L. STOUCH, a citizen of the United States, residing at York, in the county of York and State of Pennsylvania, have invented certain new and useful Improvements in Tires, of which the following is a specification.

This invention relates to tires for vehicle wheels, and more particularly to resilient, airless tires.

An object of the invention is the provision of a tire casing having an inwardly extending, centrally disposed rib provided with means for locking the beads of the tire in position.

A further object is the provision of a rib of varying degrees of hardness.

A further object is the provision of a tire of the type described, wherein the fabric extending through the side walls is depressed in the crown portion of the tire into the top of the rib or filler block to strengthen the rib and hold the fabric in proper position.

In the accompanying drawings, I have shown one embodiment of the invention. In this showing.

Figure 1:
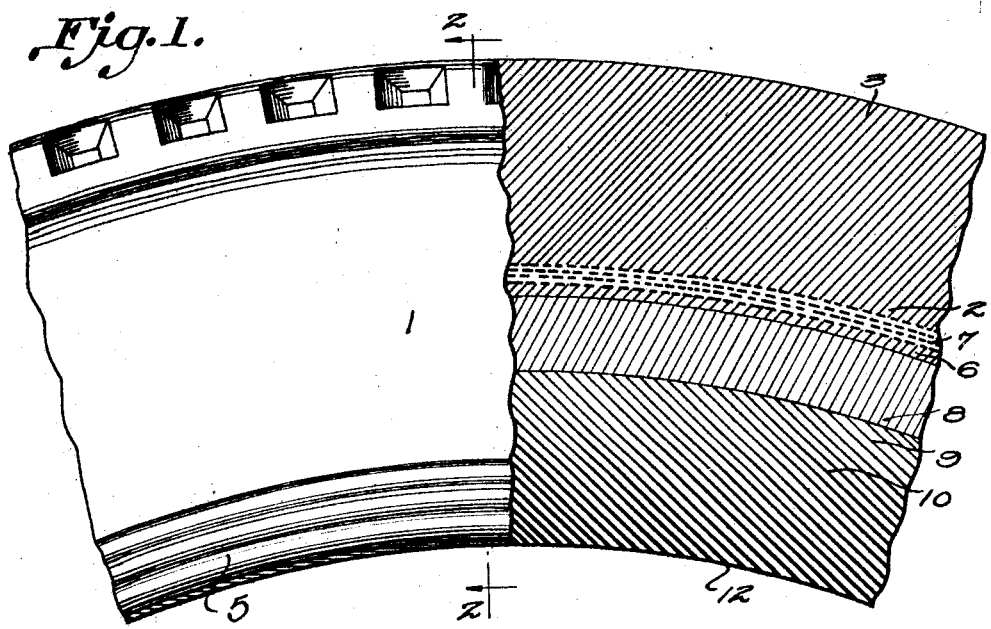
Figure 2:
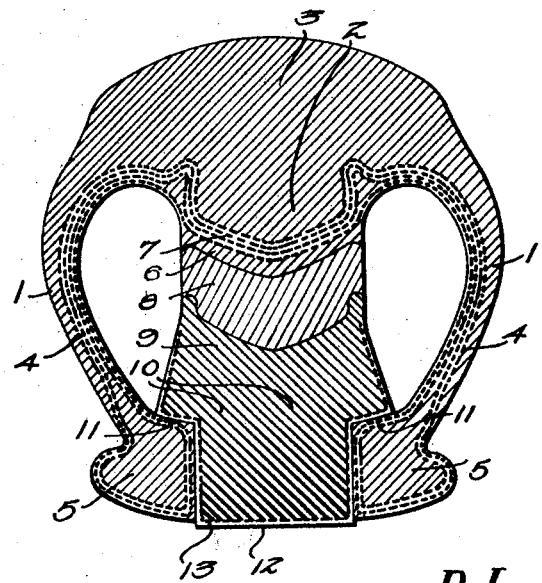

Figures 1 is a side elevation of a portion of the tire, parts being shown in section, and, Figure 2 is a transverse sectional view on line 2—2 of Figure 1.

Referring to the drawings, the reference numeral 1 designates the side walls or wings of a tire similar in external appearance and shape to the ordinary pneumatic tire casing. These side walls are provided with a crown 2 which is thickened to form a tread 3. The usual fabric strips 4 extend through the side walls of the tire and surround beads 5, arranged at the lower end of each side wall. Substantially centrally of the crown portion of the tire, there is provided an inwardly extending portion 6 and the fabric passing through the crown portion is extended inwardly through this portion, as indicated at 7. A rib or filler block extends inwardly from the center of the crown of the tire to the base and is adapted to rest upon the rim. As shown, this rib comprises a plurality of sections of varying degrees of hardness. An upper section 8 of relatively soft rubber is secured to the rubber forming the casing and a harder section 9 is arranged below the relatively soft rubber. This harder section may be provided with a filling of linters, silk, or other fibres to produce the proper degree of hardness. The lower end 10 of the rib is formed of a relatively hard composition and is provided with a reduced portion forming shoulders 11 which are adapted to rest upon the top of the beads, the width of the extreme end 12 being equal to the distance between the inner edges of the beads when the tire is arranged on the rim.

The rib is provided with a layer of rubberized fabric 13, arranged near its edge and extending through the harder rubber section to help stiffen it, and prevent the tire from swaying when the wheel is turned.

By means of the construction disclosed, I provide an airless tire having the resiliency of a pneumatic tire and eliminating the objections of the pneumatic tire. The inwardly extending portion 7 of the fabric binds or locks the rib to the casing and permits the use of a heavier tread. In tires of this type, it has heretofore been the tendency of the tread and rib to separate from each other, which is prevented by the construction disclosed.

The provision of shoulders 11 securely locks the parts in position on the rim of the wheel and prevents the beads from becoming displaced thereby permitting the tire to come off the wheel. In a pneumatic tire, the pressure of air within the tube securely holds the beads in place, but in the construction of airless tires heretofore proposed, no positive means have been provided for retaining the beads of the tire in position.

A further advantage of the present construction is the use of a rib of varying degrees of hardness, whereby sufficient strength is afforded to support the load and at the same time, the soft rubber portion 8 affords the necessary resiliency to produce the effect of a pneumatic tire.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a casing having a crown portion, said crown portion being provided with an inwardly extending portion, fabric reenforcing arranged in said casing and extending through said inwardly extending portion, and a rib formed on said inwardly extending portion and projecting toward the base of the tire.

2. In a device of the character described, a casing having a crown portion, said crown portion being provided with an inwardly extending portion, fabric reenforcing arranged in said casing and extending through said inwardly extending portion, and a rib formed on said inwardly extending portion and projecting toward the base of the tire, the lower end of said rib being reduced to form shoulders adapted to engage the inner edges and top of the tire beads when the tire is in position.

3. In a device of the character described, a casing having a crown portion, said crown portion being provided with an inwardly extending portion, fabric reenforcing arranged in said casing and extending through said inwardly extending portion, and a rib formed on said inwardly extending portion and projecting toward the base of the tire, said rib being formed of a plurality of rubber sections of varying degrees of hardness and being provided with shoulders upon its lower end adapted to engage the beads of the tire when in position.

In testimony whereof I affix my signature in presence of two witnesses.

DANIEL L. STOUCH.

Witnesses:
NOAH C. MAY,
JOHN A. DEETES.